United States Patent [19]

Hergeth

[11] Patent Number: 4,783,892
[45] Date of Patent: Nov. 15, 1988

[54] METHOD AND APPARATUS FOR CUTTING A TYING MEMBER OF A BALE OF A RAW MATERIAL

[76] Inventor: Hubert Hergeth, Kockerellstr. 4, D-5100 Aachen, Fed. Rep. of Germany

[21] Appl. No.: 929,063

[22] Filed: Nov. 7, 1986

[30] Foreign Application Priority Data

Nov. 13, 1985 [DE] Fed. Rep. of Germany ....... 3540190
Jun. 30, 1986 [DE] Fed. Rep. of Germany ....... 3621912
Sep. 18, 1986 [DE] Fed. Rep. of Germany ....... 3631707

[51] Int. Cl.$^4$ ..................... B23P 19/02; B23P 23/00
[52] U.S. Cl. ................................. 29/426.4; 29/564.3; 83/370; 83/639; 83/909
[58] Field of Search ............... 83/639, 909, 370; 29/564.3, 426.4

[56] References Cited

U.S. PATENT DOCUMENTS

| | | | |
|---|---|---|---|
| 2,820,282 | 1/1958 | Schneider, Jr. ................... | 83/909 |
| 3,513,522 | 5/1970 | Thomson ........................... | 83/909 |
| 4,250,783 | 2/1981 | Ogle .................................. | 29/564.3 |
| 4,370,796 | 2/1983 | Wilson ............................... | 83/909 |
| 4,437,223 | 3/1984 | Petros ................................ | 29/564.3 |
| 4,718,157 | 1/1988 | Keyzers et al. ................... | 29/426.4 |

*Primary Examiner*—E. R. Kazenske
*Assistant Examiner*—Eugenia A. Jones
*Attorney, Agent, or Firm*—Herbert Dubno

[57] ABSTRACT

A cutting apparatus for cutting a tying member of a bale of raw material by a cutting blade movable at a high speed against the tying member of the bale comprises a cutting blade with a cutting element having a length which is equal to a small fraction of the width of the bound surface of the bale substantially parallel to the length of the cutting blade and a cutter carriage device on which the cutting blade is mounted by which the cutting blade is movable toward the bale with a speed which is at least 3 m/sec on impact on the tying member.

6 Claims, 3 Drawing Sheets

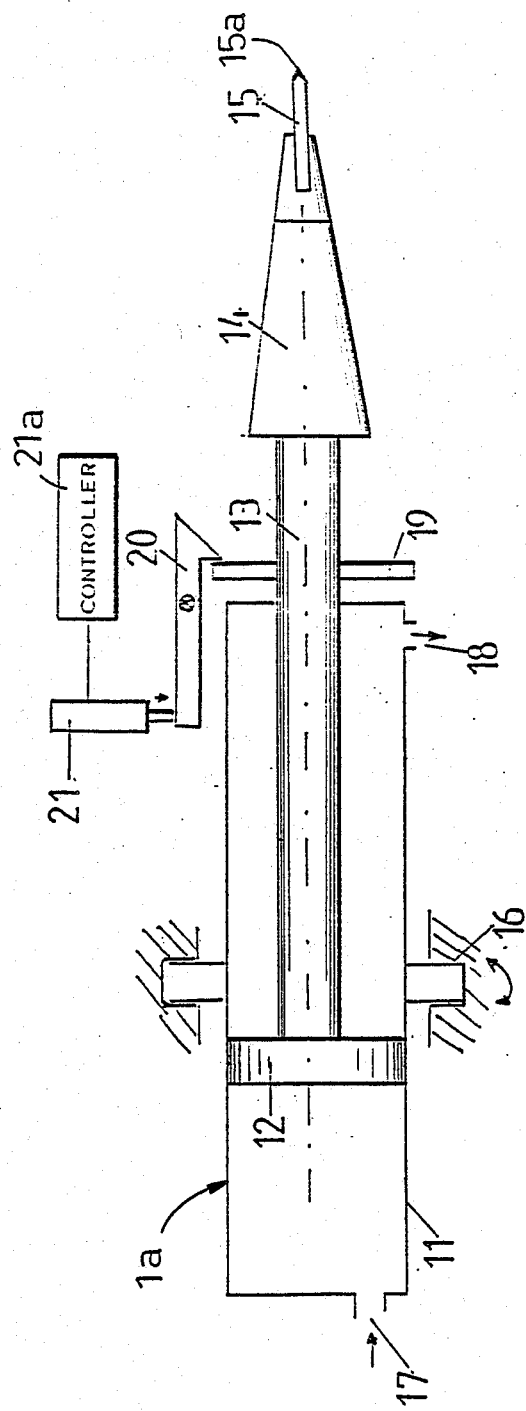
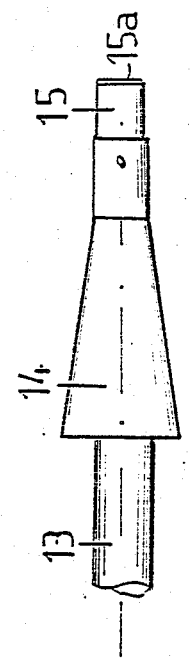
Fig. 2
Fig. 3

4,783,892

METHOD AND APPARATUS FOR CUTTING A TYING MEMBER OF A BALE OF A RAW MATERIAL

FIELD OF THE INVENTION

My present invention relates to an apparatus for cutting a tying member of a bale of a raw material, particularly a bale of a raw material or a waste material for or from the textile industry, paper industry or tobacco industry.

BACKGROUND OF THE INVENTION

A tying member of such a bale generally comprises a narrow steel band or a steel wire or a number of such wires. To process a bale, these tying members must be removed, i.e. severed. Up to now this cutting has been done manually, e.g. by an ax or a side cutter severing the ties one at a time. This work is dangerous since with a bale under a high tying pressure, the steel band or wire may snap out like a whip and fly through the air uncontrollably.

An apparatus for cutting a tying member of a bale of a raw material is known in which a cutting blade moves with a high speed toward the bale. The blade can have a length of about 1.5 m, a width of 20 cm and a thickness of 1 cm can be pivot able about a rotating pin provided at one of its ends and impacts over the entire width of a bale by action of a strong spring whose tension is provided by a twin crank drive. Such a device is of expensive construction and problematical in operation. It is not always reliable since under certain circumstances individual tying members which have been pressed too deeply into the bale may not be cut through by a blade impacting over the entire bale width.

OBJECTS OF THE INVENTION

It is an object of the invention to provide an improved cutting apparatus for cutting a tying member of a bale of a raw material which avoids the aforementioned drawbacks.

It is another object of my invention to provide an improved cutting apparatus for cutting a tying member of a bale of a raw material which has a mechanism which is of simple construction and is easy to operate.

It is also an object of my invention to provide an improved cutting apparatus for cutting a tying member of a bale of a raw material which has an improved reliability.

SUMMARY OF THE INVENTION

These objects and others which will become more readily apparent hereinafter are attained in accordance with my invention in a cutting apparatus for cutting a tying member from a bale of a raw material by a cutting blade movable with a high speed against it.

According to my invention these objects are attained in a cutting apparatus having a cutting blade for cutting a tying member of a bale whose cutting element has a length transverse to the tying member wound around the bale which is equal to a small fraction of the width of the bound surface of the bale parallel to it and is moved with a speed toward the tying member which is at least 3 m/sec on impact on the tying member.

The cutting edge of the cutting blade can be about 20 to 60 mm in length. Advantageously the cutting blade and the means for providing its cutter motion, i.e. its drive, are supported on a cutter carriage which is movable on a guide which is parallel to a side of the bound bale. The cutting apparatus can have a sensor movable with the cutter carriage device along the bale which activates the cutting motion of the cutting blade as soon as it is opposite a tying member.

Advantageously the cutter carriage is connected with a drive unit by which it is movable on the guide.

The cutter carriage for providing the cutting motion of the cutting blade can have a piston element connected with the cutting blade which is movable by a high pneumatic pressure and is prevented from engaging in this motion by a releasable mount. When the mount is released the cutting blade is driven toward the bale by this piston element.

The cutter carriage device can have sensor which releases or triggers the cutter motion of the cutting blade as soon as the cutting blade is positioned opposite a tying member after motion along the bale. The sensor can be supported on the cutter carriage device. The guide is advantageously rigidly mounted on a frame wall which is pivotable about a vertical axis. That vertical axis can advantageously be positioned from 0.10 to 0.90 m in front of the frame wall.

BRIEF DESCRIPTION OF THE DRAWING

The above and other objects, features and advantages of my invention will become more readily apparent from the following description, reference being made to the accompanying highly diagrammatic drawing in which:

FIG. 2 is a side elevational view showing the impacting mechanism for the cutting, blade used in the apparatus of FIG. 1 in a somewhat larger scale than FIG. 1;

FIG. 3 is schematic top plan view of a part of the impacting mechanism for the cutting blade shown in FIG. 2;

SPECIFIC DESCRIPTION

Figure 1:
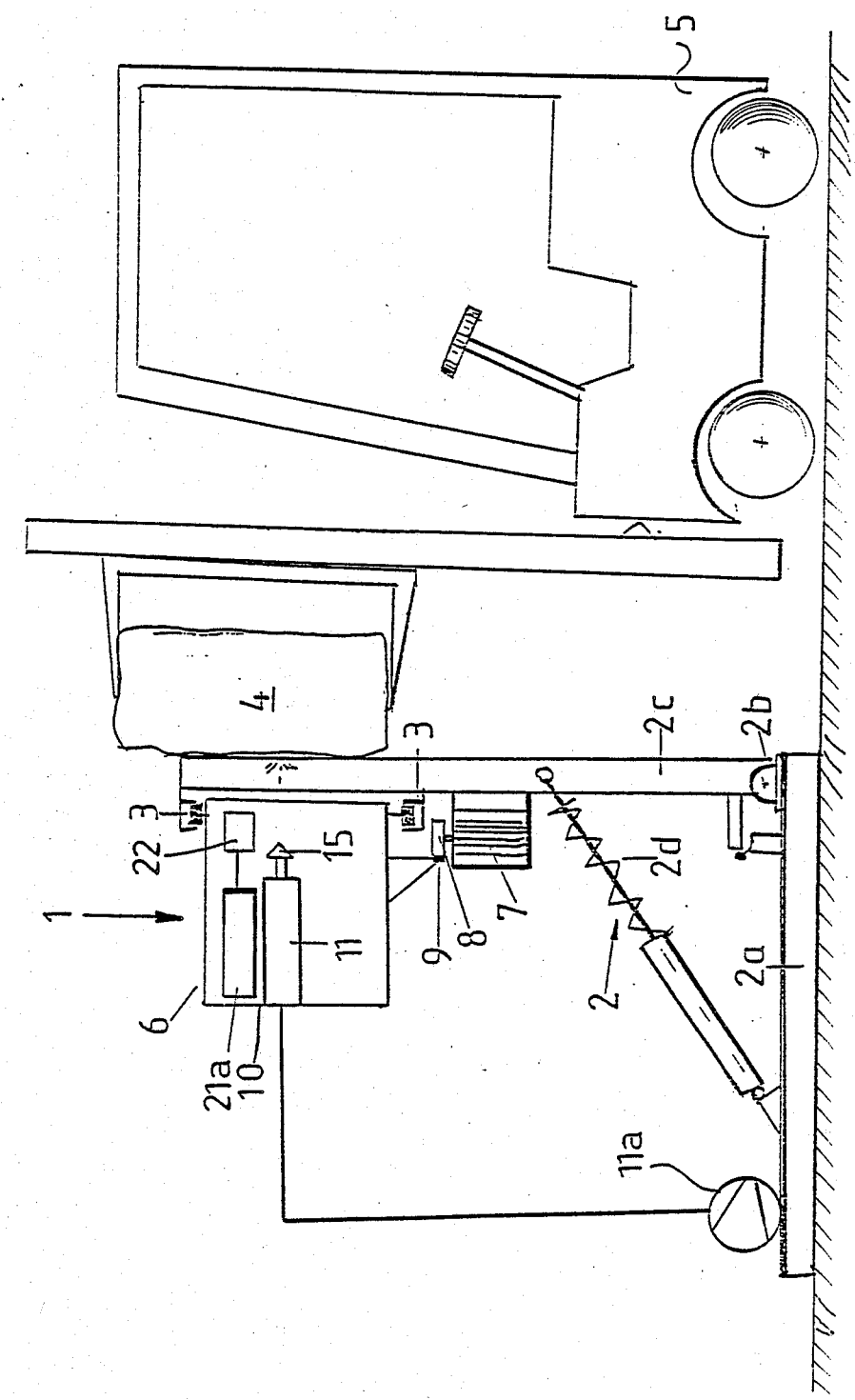
FIG. 1 is a schematic side elevational view of one embodiment of an apparatus for cutting a tying member of a bale of a raw material according to my invention.

In the apparatus shown in FIG. 1 a stand 2c held erect by a spring 2d and pivotable about a pivot joint 2b is provided on the base plate 2a of a frame 2.

This stand 2c supports a housing 10 in horizontal guides 3. The housing 10 contains the cutter carriage 1 whose cutting blade 15 is directed toward a fiber bale 4 carried by a stacker of lift truck 5.

The housing 10 with the cutter carriage device 1 is slidable on the guides 3 along the bale 4 by a chain 9 which is engaged by a sprocket wheel 8 driven by a motor 7 so that the cutting blade 15 is brought into a position in which it is opposite a tying member 4a of the bale 4.

As shown in FIG. 2 the cutter carriage device 1a comprises a cylinder 11 by whose piston 12 a piston rod 13 is movable which has at its other end a holder 14 for the cutting blade 15.

The cylinder 11 is mounted pivotally on the rotating bolt 16 in order to avoid clamping of the piston rod 13 by lateral forces. The cylinder 11 is connected with a source 11a of pressurized air of about 8 bar by an inlet valve 17.

A stop disk 19 on the piston rod 13 is restrained by a pawl 20. The pawl 20 can be lifted by a cutter trigger 21 operated by a control 21a to allow cutting motions in the direction of the bale 4. The cutter trigger 21 can be a magnetic or pneumatic cylinder.

The cutting blade 15 is thus released to travel with such a high speed toward the bale 4 that its cutting element 15a meets the bale 4 at a velocity of about 3 to 9 m/sec and an energy of at least 150 Nm. The cutting edge 15a of the cutting blade 15 has a length of at least a few centimeters, particularly 2 to 7 cm.

Advantageously the cutter carriage device 1 has a sensor 22 which responds immediately when it and the cutting blade 15 are positioned opposite a tying member 4a and the cutting motion is released upon operation of the control 21a by the sensor 22.

Figure 4:
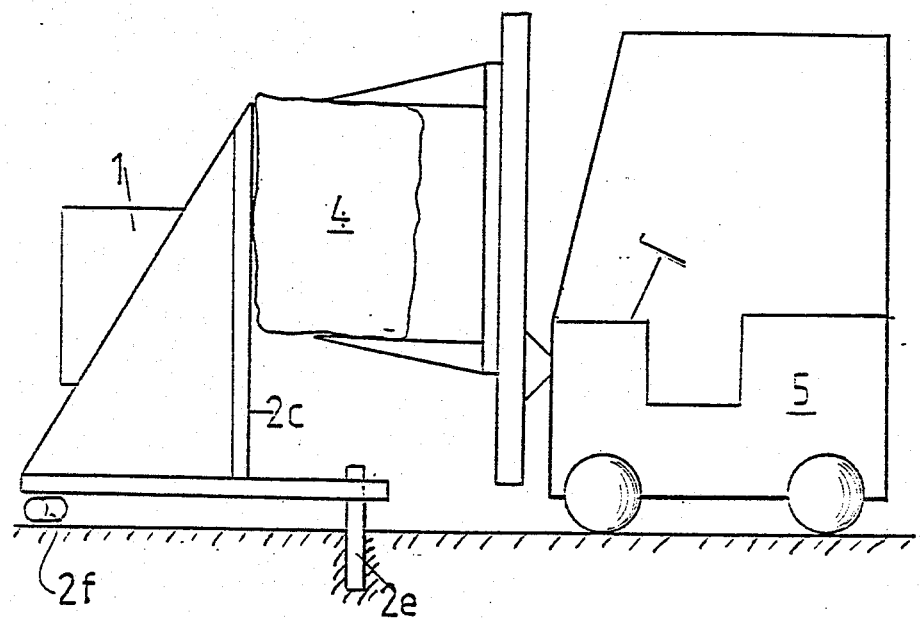
FIG. 4 is a schematic side elevational view of another embodiment of an apparatus for cutting a tying member of a bale of a raw material according to my invention.
Figure 5:
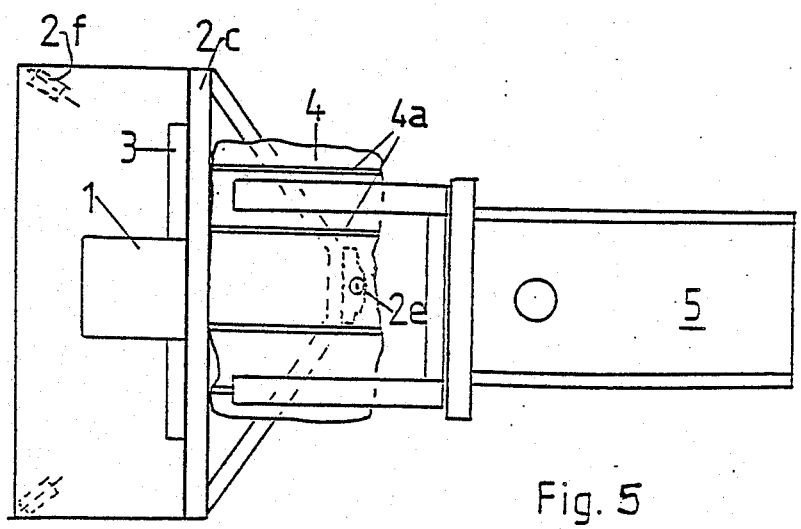
FIG. 5 is schematic top plan view of the embodiment according to FIG. 4.

For compensation of irregularities in the bale shape as shown in FIGS. 4 and 5 the frame wall 2 can be pivotable about a vertical axis 2e which is about 0.1 to 0.9 m in front of the frame wall 2, that is in the direction of the bale 4 being engaged.

I claim:

1. A method of cutting tying members surrounding a bale of material having a plurality of said tying members spaced apart over the length of said bale and exposed at a bound surface of said bale, said method comprising the steps of:
    juxtaposing said bound surface of said bale with a support having a carriage displaceable on said support parallel to the length of said bale, and a cutting blade on said carriage having a cutting element engageable with said tying members of said bale and having a length which is equal to a small fraction of said length of said bale;
    retracting said cutting blade in a direction perpendicular to said members and away from said bale and applying energy to said blade in a direction opposite to the direction of retraction and retaining said blade against said energy, said energy being sufficient to apply said blade against said members at at least 150 Nm on impact with each member;
    displacing said carriage along the length of said bale;
    sensing the alignment of said blade with each of said tying members upon the displacement of said carriage along said length of said bale; and
    releasing said blade automatically upon each sensing of the alignment of said blade with one of said tying members so that said blade is driven with said energy against said tying member at a velocity of at least 3 m/sec to cut the respective tying member.

2. A cutting apparatus for tying members surrounding a bale of material having a plurality of said tying members spaced apart over the length of said bale, said apparatus comprising:
    a support juxtaposable with a bound surface of said bale;
    a cutting blade having a cutting element engageable with said tying members of said bale having a length which is equal to a small fraction of said length of said bale;
    powered means connected to said blade for driving same against said members in a direction perpendicular to said members and said surface of said bale with a speed of at least 3 m/sec and sufficient at impact with each tying member to cut the tying member by impact;
    a carriage displaceable on said support transversely to said direction and along said length of said bale and carrying said powered means and said cutting blade for aligning said cutting blade in succession with each of said tying members;
    a guide on said support receiving said carriage for displacement of said carriage transversely to said direction and along said length of said bale; and
    sensing means on said carriage responsive to the alignment of said cutting blade with each of said tying members and connected with said powered means for releasing same to drive said blade against the respective tying member to cut the tying member.

3. The cutting apparatus defined in claim 2 wherein the length of said cutting element is about 20 to 70 mm and said powered means is constructed and arranged to deliver an energy to said cutting blade of at least 150 Nm on impact against each of said tying members, 4. The cutting apparatus defined in claim 3, further comprising drive means connected with said carriage for displacing same along said guide transversely to said direction and along said length of said bale.

5. The cutting apparatus defined in claim 4 wherein said support is a frame swingable about a vertical axis positioned substantially 0.10 to 0.90 m ahead of said frame toward said bale.

6. The cutting apparatus defined in claim 5 wherein said powered means includes a pneumatically pressurizable cylinder and a pawl engageable with a piston of said cylinder for retaining same against pneumatic pressure in said cylinder until said pawl is released by said sensing means.

* * * * *